(12) United States Patent
Gouro et al.

(10) Patent No.: US 8,660,620 B2
(45) Date of Patent: Feb. 25, 2014

(54) ANTENNA BUILT IN MOBILE TERMINAL

(75) Inventors: Tsukasa Gouro, Kato (JP); Kazunori Katou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1142 days.

(21) Appl. No.: 12/615,765

(22) Filed: Nov. 10, 2009

(65) Prior Publication Data
US 2010/0056235 A1 Mar. 4, 2010

Related U.S. Application Data

(63) Continuation of application No. PCT/JP2007/000714, filed on Jun. 28, 2007.

(51) Int. Cl.
- *H04M 1/00* (2006.01)
- *H01Q 1/24* (2006.01)
- *H04B 1/38* (2006.01)

(52) U.S. Cl.
CPC ............... *H01Q 1/243* (2013.01); *H01Q 1/242* (2013.01); *H04B 1/3833* (2013.01)
USPC ......... 455/575.1; 343/702; 343/721; 343/895

(58) Field of Classification Search
USPC ................. 455/436, 575.7; 343/702, 721, 895
See application file for complete search history.

(56) References Cited

U.S. PATENT DOCUMENTS

| | | | |
|---|---|---|---|
| 6,396,442 B1 | 5/2002 | Kawahata et al. | |
| 6,697,022 B2 * | 2/2004 | Ponce De Leon et al. | 343/702 |
| 6,903,694 B2 * | 6/2005 | Kim | 343/702 |
| 7,042,400 B2 | 5/2006 | Okubo et al. | |
| 7,142,160 B2 | 11/2006 | Furuno et al. | |
| 7,830,317 B2 * | 11/2010 | Yamazaki | 343/702 |
| 8,004,471 B2 * | 8/2011 | Yamazaki | 343/702 |
| 8,310,404 B2 * | 11/2012 | Kishimoto et al. | 343/721 |
| 2002/0021250 A1 * | 2/2002 | Asano et al. | 343/702 |

(Continued)

FOREIGN PATENT DOCUMENTS

| | | |
|---|---|---|
| JP | 2001-298320 A | 10/2001 |
| JP | 2001-298321 A | 10/2001 |

(Continued)

OTHER PUBLICATIONS

International Search Report of PCT/JP2007/000714, date of mailing Oct. 9, 2007.

(Continued)

*Primary Examiner* — William D Cumming
(74) *Attorney, Agent, or Firm* — Westerman, Hattori, Daniels & Adrian, LLP

(57) ABSTRACT

An antenna built in a mobile phone that includes a front case having, on its surface, an operation portion and a rear case arranged on the rear of the front case is provided. The antenna includes a bar-shaped support member that is made of a synthetic resin and is located in the rear case along an upper side of the inside surface thereof, an antenna element integrally formed with the support member, and a concave portion provided in the support member to avoid interfering with a strap retaining portion that projects into the rear case at the center of the upper side of the rear case. The antenna element is formed in such a manner that the antenna element straddles a gap between edge portions of both side walls of the concave portion to avoid interfering with the strap retaining portion.

8 Claims, 18 Drawing Sheets

(56) References Cited

U.S. PATENT DOCUMENTS

| | | |
|---|---|---|
| 2002/0024465 A1 | 2/2002 | Kawahata et al. |
| 2003/0137468 A1* | 7/2003 | Kim .............................. 343/895 |
| 2005/0062650 A1 | 3/2005 | Furuno et al. |
| 2005/0099344 A1 | 5/2005 | Okubo et al. |
| 2009/0322625 A1* | 12/2009 | Yamazaki ..................... 343/702 |
| 2010/0056235 A1* | 3/2010 | Gouro et al. ................ 455/575.7 |
| 2010/0188301 A1* | 7/2010 | Kishimoto et al. ........... 343/721 |
| 2010/0279694 A1* | 11/2010 | Yagi et al. ..................... 455/436 |
| 2011/0018772 A1* | 1/2011 | Yamazaki ..................... 343/702 |
| 2011/0038282 A1* | 2/2011 | Mihota et al. ................. 370/276 |
| 2012/0001808 A1* | 1/2012 | Nekozuka ..................... 343/702 |

FOREIGN PATENT DOCUMENTS

| | | |
|---|---|---|
| JP | 2002-217628 A | 8/2002 |
| JP | 2003-283225 A | 10/2003 |
| JP | 2005-86788 A | 3/2005 |
| JP | 2005-142785 A | 6/2005 |
| JP | 2007-13456 A | 1/2007 |

OTHER PUBLICATIONS

Japanese Office Action dated Nov. 22, 2011, issued in corresponding Japanese Patent Application No. 2009-520163.

* cited by examiner

ANTENNA BUILT IN MOBILE TERMINAL

CROSS-REFERENCE TO RELATED APPLICATIONS

This application is a continuing application, filed under 35 U.S.C.§111(a), of International Application PCT/JP2007/000714, filed on Jun. 28, 2007, the entire contents of which are incorporated herein by reference.

FIELD

The embodiments discussed herein are related to an antenna configured to be easily mounted on a thin mobile phone, and a mobile phone including such an antenna.

BACKGROUND

According to conventional techniques, a casing (case) of a mobile phone is formed by molding a synthetic resin such as a polycarbonate resin or an ABS resin. A folding mobile phone having a receiver side and a transmitter side coupled to each other by a hinge mechanism is taken as an example. A transmitter-side casing is composed of a front case having, on its surface, an operation portion, and a rear case that is arranged to make contact with the rear of the front case and has a battery containing portion therein.

In recent years, it has been increasingly desired to reduce the thickness of mobile phones and improve the appearance and usability thereof. Further reduction in the thickness of mobile phones requires reduction in size and thickness of individual parts of the mobile phone such as front cases, rear cases, batteries, printed circuit boards, and other electronic components. Further, there is an increasing trend in the use of a built-in antenna in a mobile phone in light of the appearance thereof. This requires an antenna to be efficiently housed in a small space within a casing.

A conventional antenna (built-in antenna) of a mobile phone has a structure in which antenna elements made of metal are integrally formed with a bar-shaped support member made of a synthetic resin, and is located in a rear case along the upper side of the inside surface thereof. An example of a mobile phone containing such an antenna therein is "F882iES" placed on the market by FUJITSU LIMITED.

Incidentally, a strap has conventionally been attached to a mobile phone in many cases. This is because such a strap helps a user to carry his/her mobile phone or to remove the same from his/her bag, or such a strap is attached as a mobile phone ornament. A casing, therefore, is provided with a strap retaining portion that projects into the casing, which reduces the internal space of the casing. The commercially available mobile phone described above has a strap retaining portion formed adjacent to an end of the upper side of a rear case. It is desired, however, to provide a strap retaining portion in the center of the upper side of a rear case to improve the usability and appearance of a mobile phone.

In such a case, however, the strap retaining portion is caused to project into a casing at the center of the upper side thereof. The strap retaining portion, thus, interferes with an antenna to be located in the position where the strap retaining portion projects.

SUMMARY

An antenna according to an aspect of the invention is an antenna built in a mobile phone, the mobile phone including a front case that has an operation portion on a surface of the front case and a rear case that is arranged on a rear side of the front case. The antenna includes a support member that has a bar shape, is made of a synthetic resin, and is located in the rear case along an upper side of an inside surface of the rear case, an antenna element integrally formed with the support member, and a concave portion provided in the support member to avoid interfering with a strap retaining portion that projects into the rear case at a center of the upper side of the rear case, wherein the antenna element is formed in such a manner that the antenna element straddles a gap between edge portions of both side walls of the concave portion to avoid interfering with the strap retaining portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
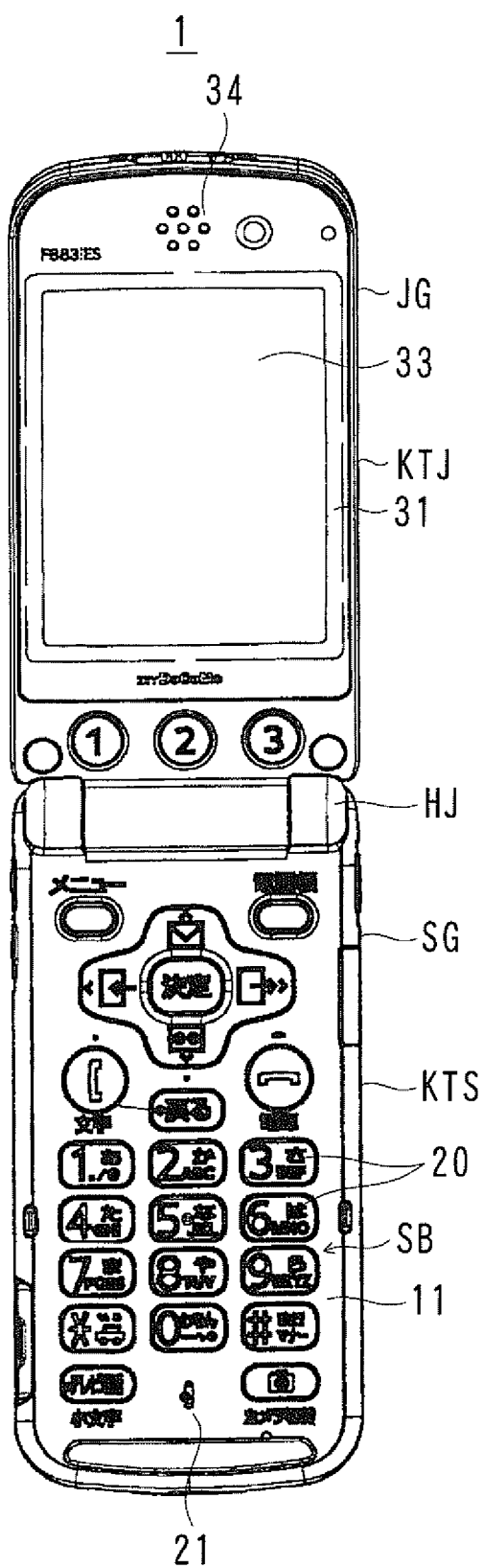
FIG. 1 is a front view illustrating the appearance of a mobile phone according to an embodiment.
Figure 2:
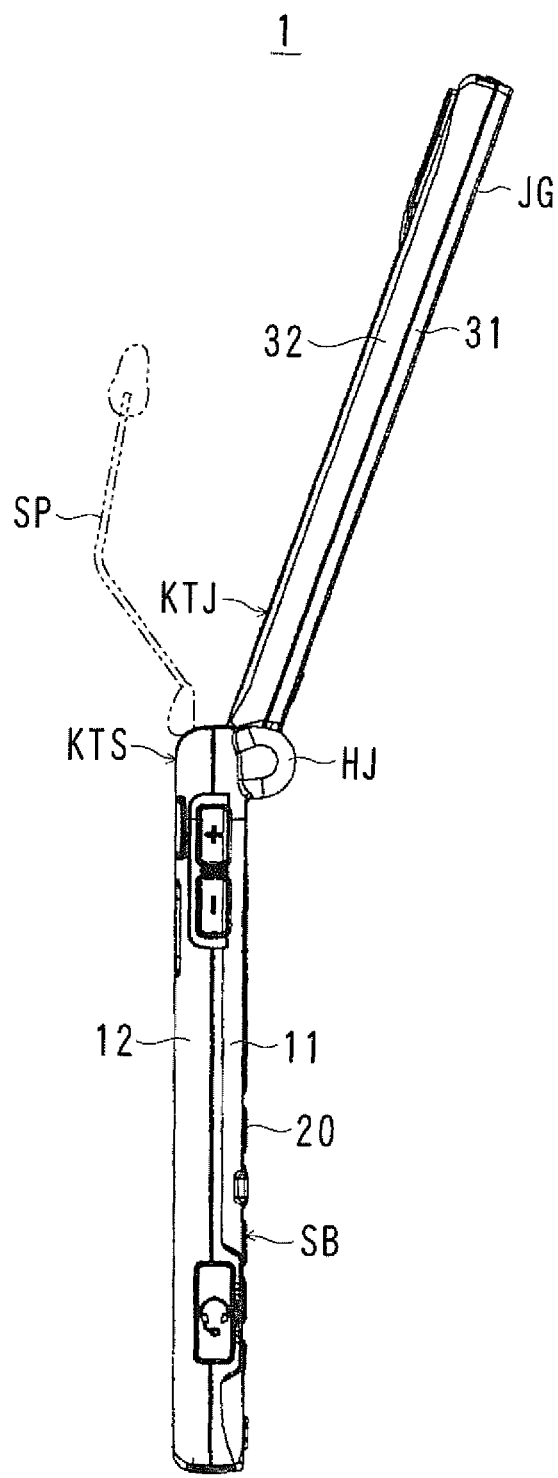
FIG. 2 is a left side view of the mobile phone illustrated in FIG. 1.
Figure 3:
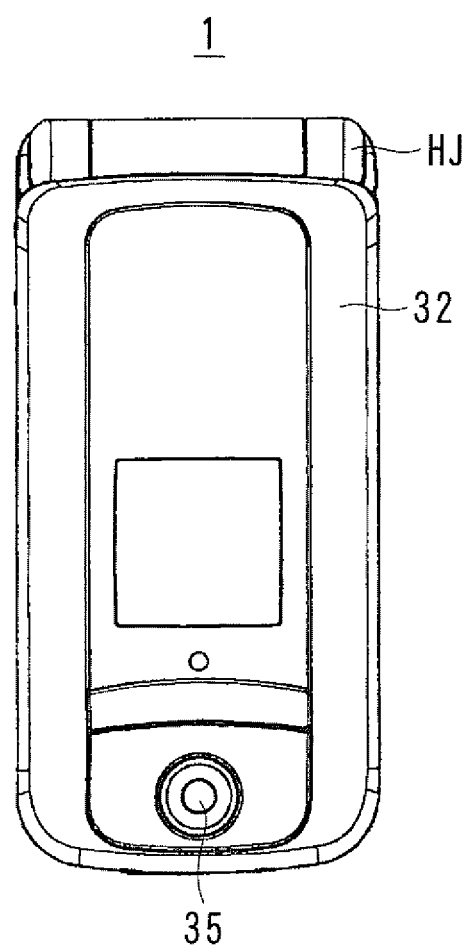
FIG. 3 is a front view illustrating a mobile phone that is in a closed position.
Figure 4:
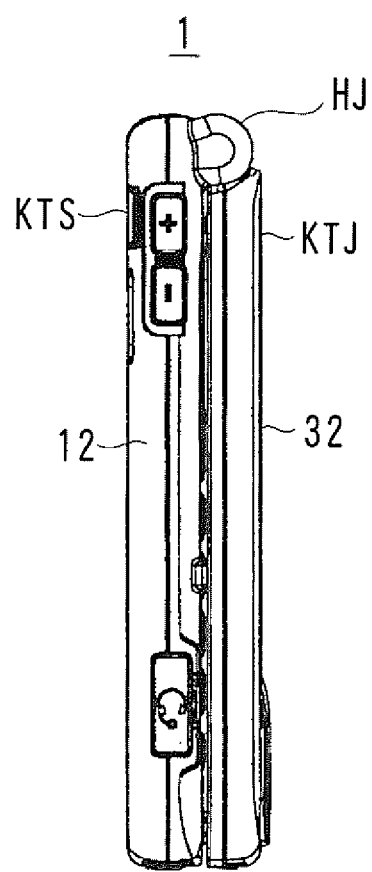
FIG. 4 is a left side view illustrating a mobile phone that is in a closed position.
Figure 5:
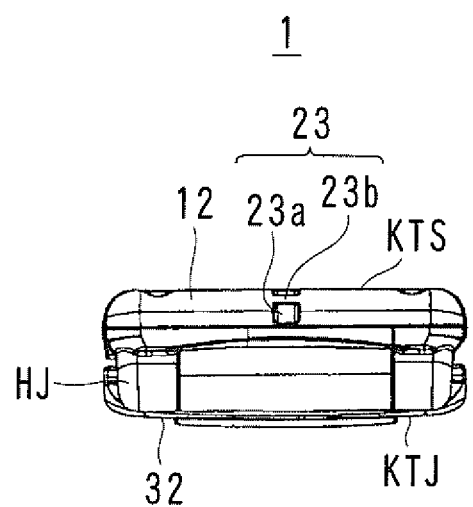
FIG. 5 is a top plan view illustrating a mobile phone that is in a closed position.

Preferred embodiments of the present invention will be explained with reference to accompanying drawings.

As illustrated in FIGS. 1-6, a mobile phone 1 according to this embodiment is a folding mobile phone having a transmitter side (fixed side) SG and a receiver side (movable side) JG rotationally coupled to each other by a hinge HJ. A casing KTS of the transmitter side SG includes a front case 11 having, on its surface, an operation portion SB, and a rear case 12 arranged to make contact with the rear of the front case 11. Each of the front case 11 and the rear case 12 is formed by molding a synthetic resin such as a polycarbonate resin or an ABS resin. A front case 31 and a rear case 32, which are described later, are also formed by molding a resin in a similar manner.

The operation portion SB has various operation buttons 20 arranged to project outwardly through holes formed on the front case 11. The operation buttons 20 are used to enter telephone numbers and other information. The operation portion SB is so configured that contacts or sensors formed on a printed circuit board 25, which is described later, detect that the operation button 20 has been pressed. The front case 11 has a voice input hole 21 for transmitting user's voice to a built-in microphone. Referring to FIG. 1, the voice input hole 21 is provided below the operation portion SB.

Figure 6:
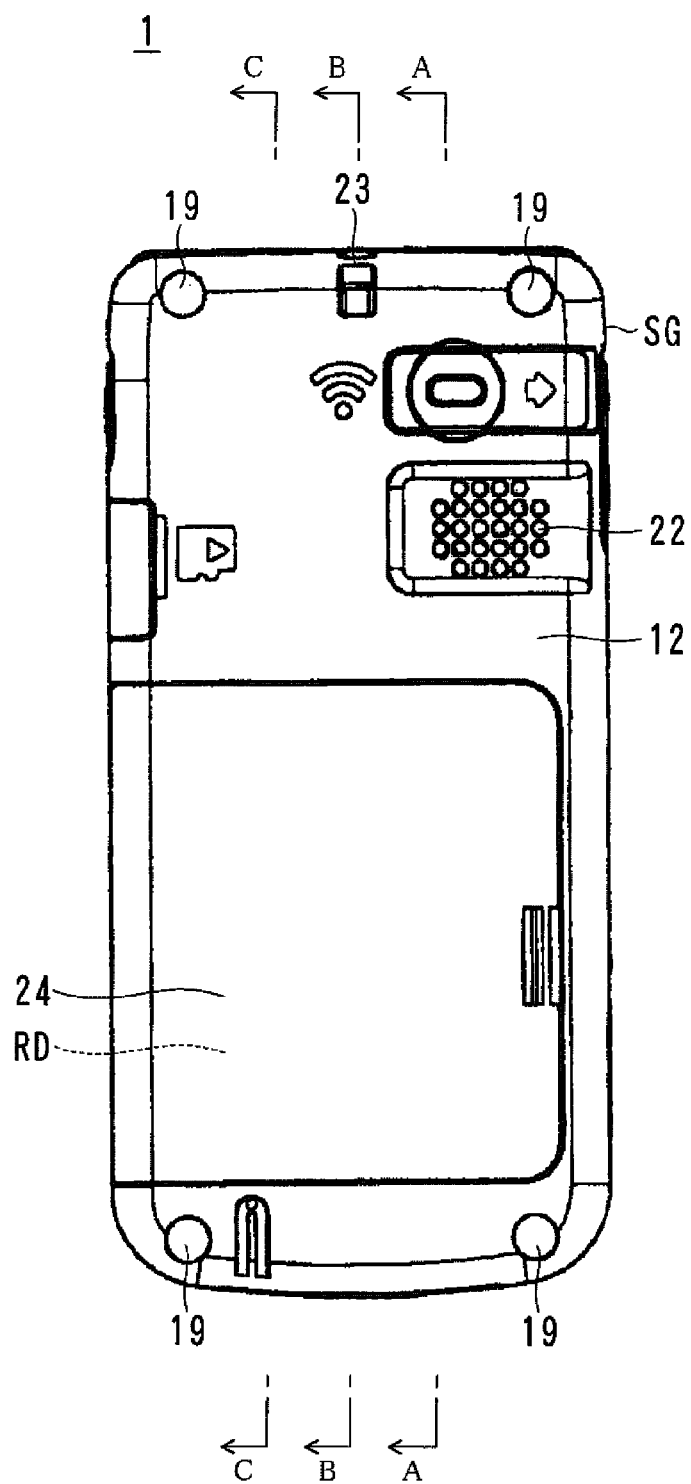
FIG. 6 is a back view illustrating a mobile phone that is in a closed position.

As clearly illustrated in FIG. 6, the rear case 12 is provided with a voice output hole 22 for externally transmitting voice outputted by a speaker, and a strap retaining portion 23 to which a strap SP is attached. The rear case 12 has, on its inside, a battery containing portion RD, and has, on its surface, a detachable battery cover 24. The front case 11 and the rear case 12 are integrated with each other by means of four screws 19 inserted from the rear case 12 and screwed into the front case 11.

A casing KTJ of the receiver side JG includes the front case 31, and the rear case 32 arranged to make contact with the rear of the front case 31. The front case 31 has, on its surface, a main display 33 implemented by a color LCD, and a voice output hole 34 for externally transmitting voice outputted by a built-in speaker for a receiver. Referring to FIG. 1, the voice output hole 34 is provided above the main display 33. The rear case 32 is provided with a lens window 35 of a built-in camera.

Figure 7:
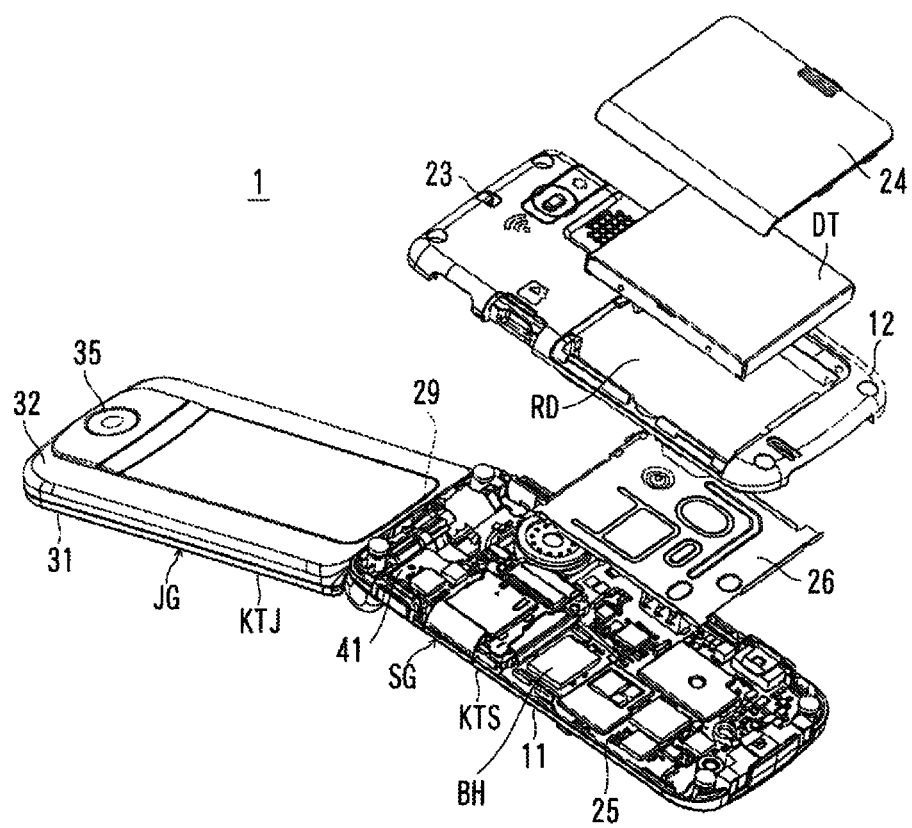
FIG. 7 is an exploded perspective view illustrating a transmitter-side casing of a mobile phone.

Referring to FIG. 7, the printed circuit board 25 is placed in the front case 11 of the transmitter side SG. The printed circuit board 25 has an LSI, an IC, a variety of connectors, a speaker, a flexible cable, and various other electronic components BH mounted on the side of the back face of the printed circuit board 25, that is, the surface facing the rear case 12. The printed circuit board 25 has an input sheet mounted on the side of the front face of the printed circuit board 25, that is, the surface facing the front case 11. The input sheet is provided with contacts and sensors for detecting that the operation button 20 has been pressed and inputting the detection.

A bottom plate 26 made of metal is attached to the bottom of the battery containing portion RD of the rear case 12 in a manner to cover almost the entire bottom thereof. A battery DT is placed on the bottom plate 26 and is covered by the battery cover 24, so that the battery containing portion RD is closed.

An antenna 29 for transmitting and receiving radio waves is located in the rear case 12 along the upper side of the inside surface thereof. Referring to FIG. 7, in the case where the front case 11 and the rear case 12 are coupled to each other, the antenna 29 is to be located at a position indicated by reference numeral 29.

Next, a description is given of a structure of the antenna 29 and a method for placing the same, with reference to FIGS. 8-15C.

Figure 8:
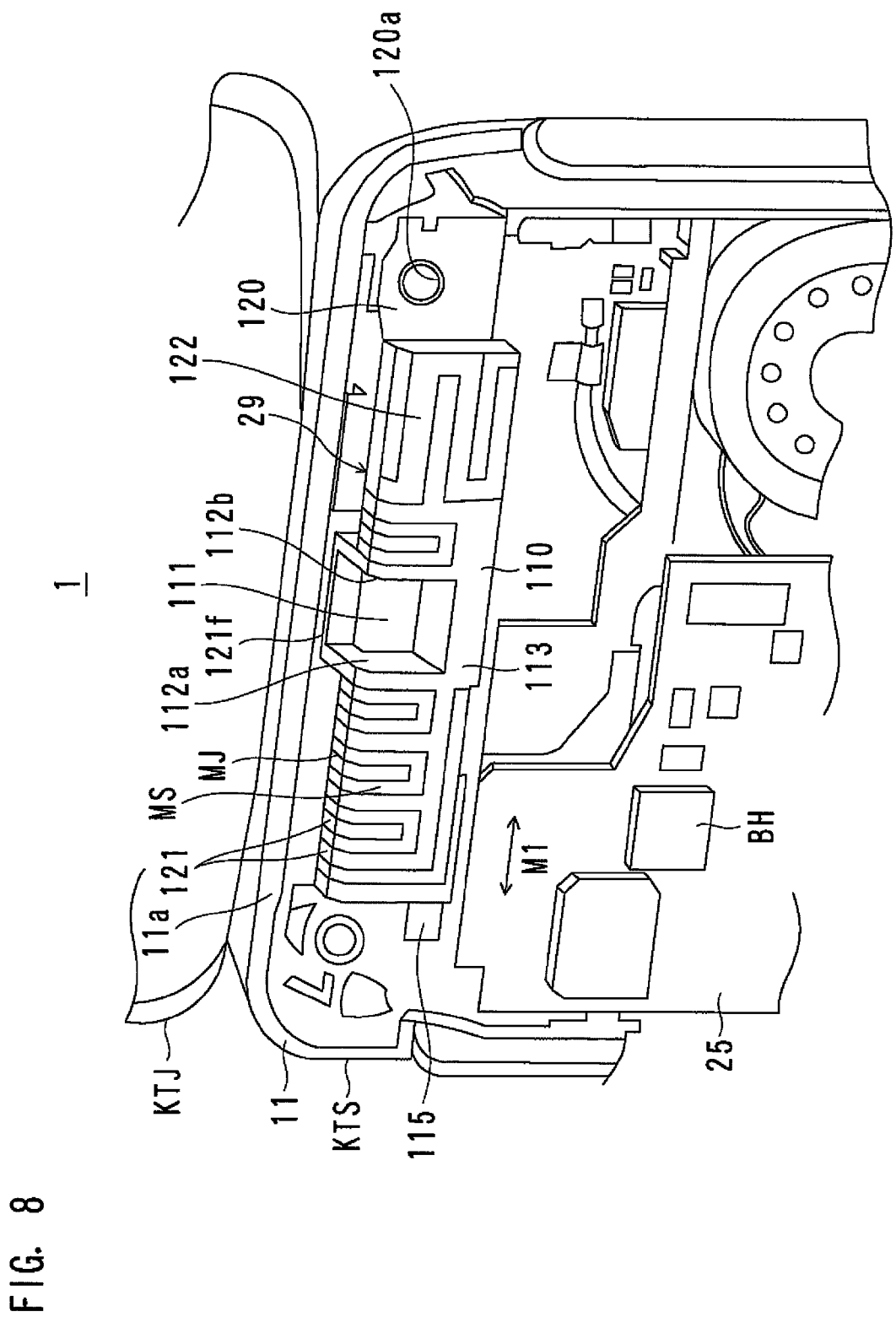
FIG. 8 is a perspective view illustrating a state in which an antenna is attached to a front case.
Figure 9:
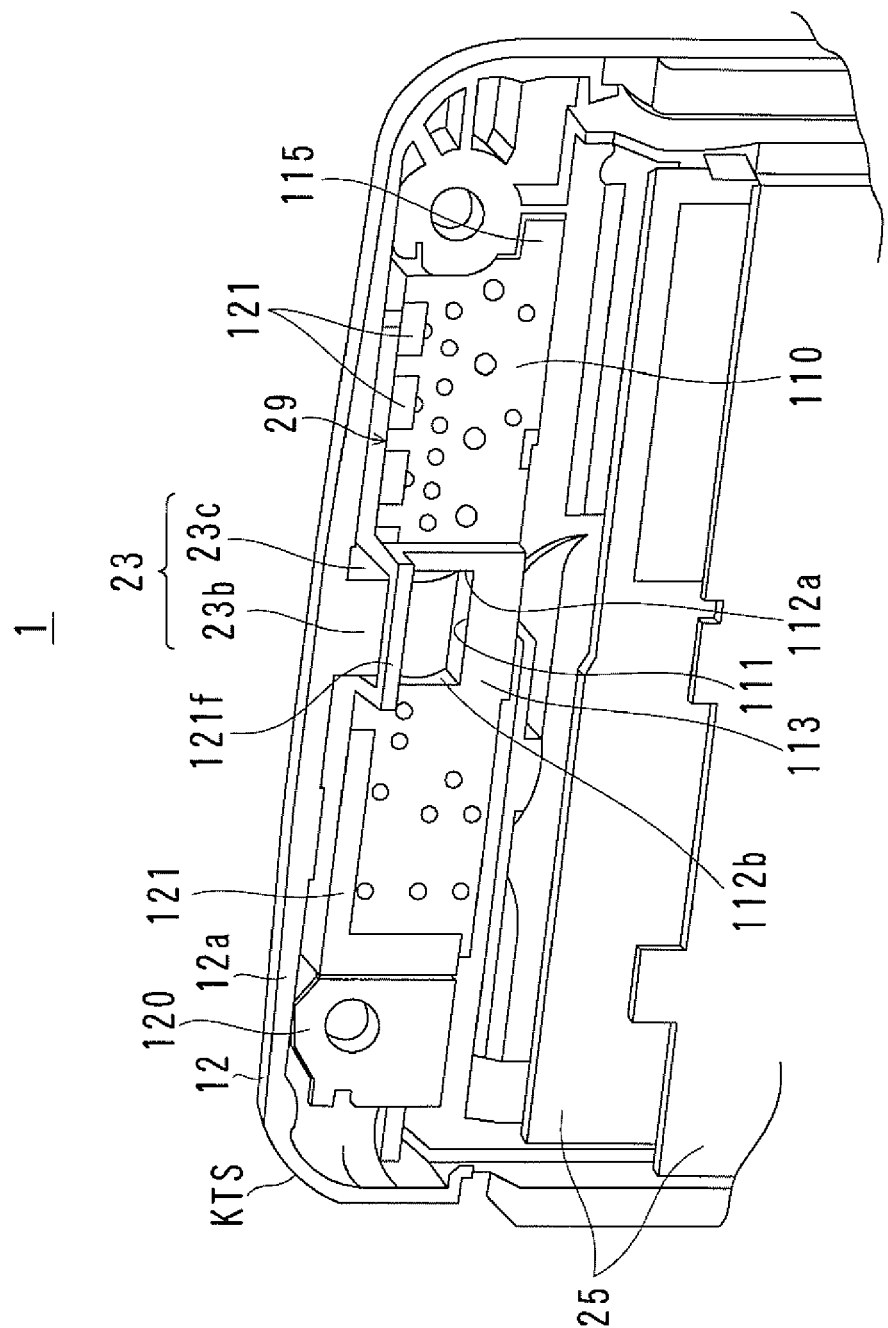
FIG. 9 is a perspective view illustrating a state in which an antenna is attached to a rear case.
Figure 10:
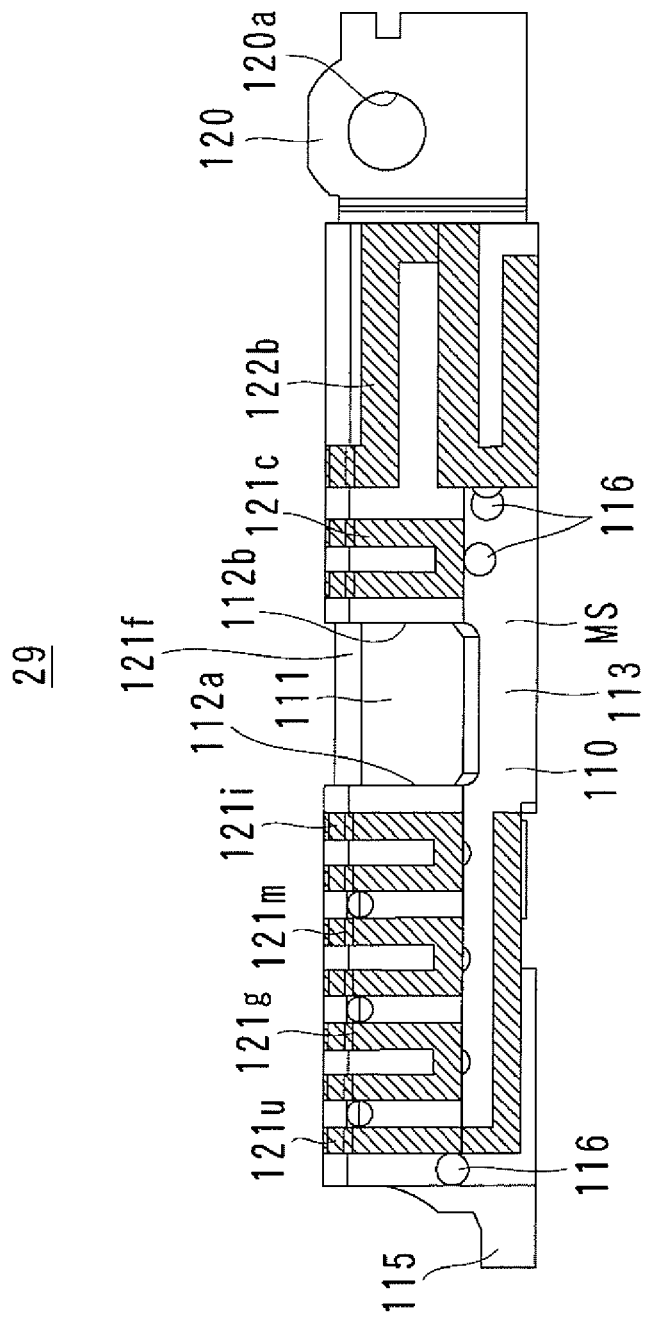
FIG. 10 is a front view illustrating an antenna.
Figure 11:
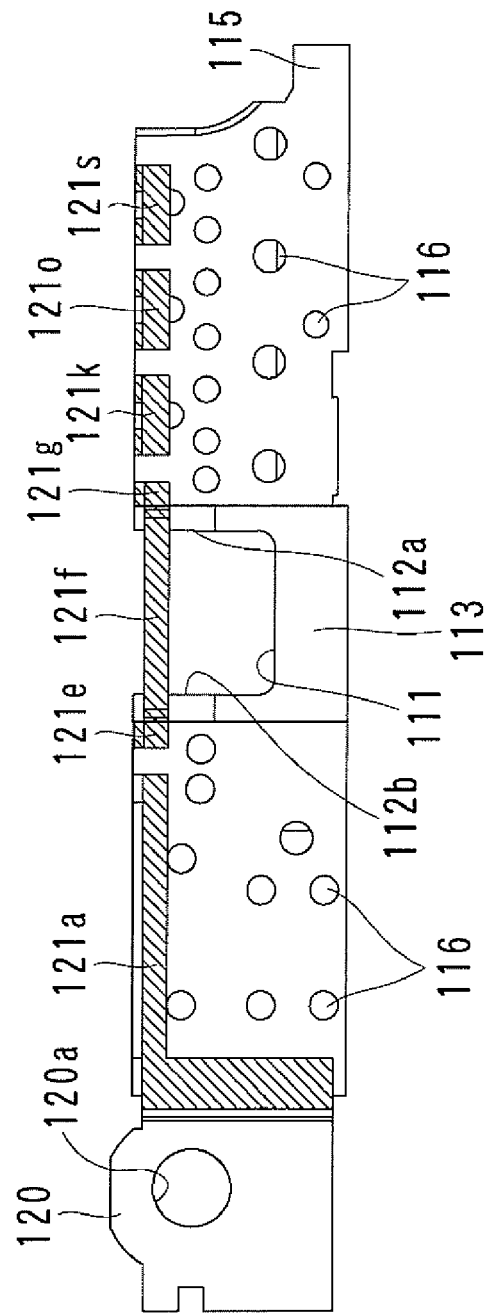
FIG. 11 is a back view illustrating an antenna.
Figure 12:
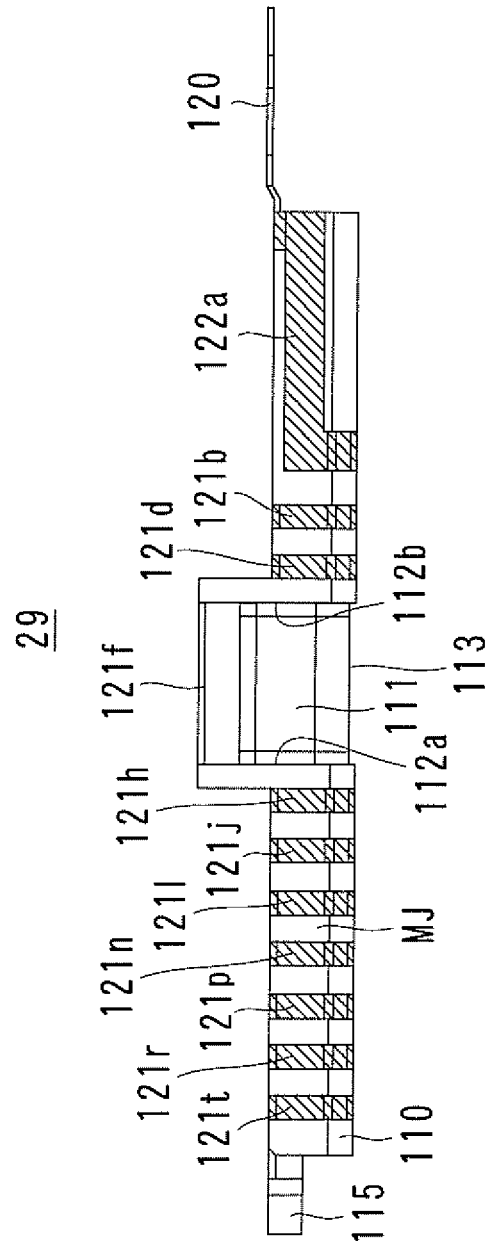
FIG. 12 is a top view illustrating an antenna.
Figure 13:
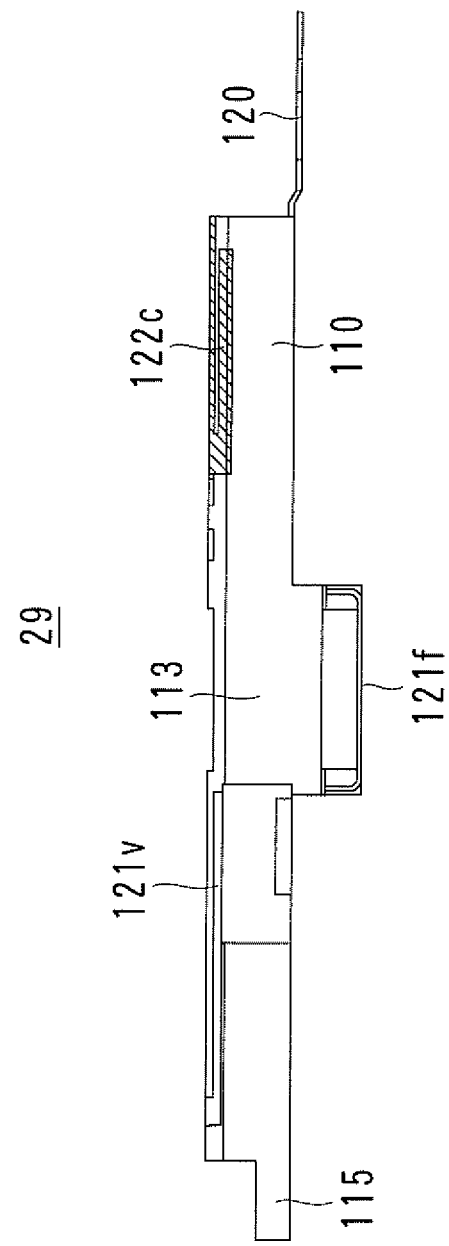
FIG. 13 is a bottom view illustrating an antenna.
Figure 14A:
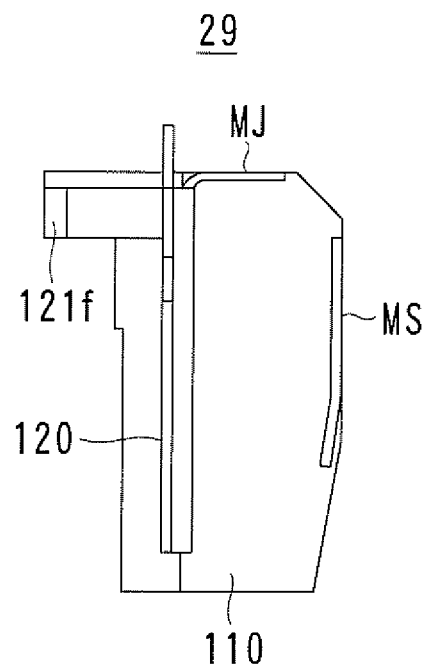
FIGS. 14A and 14B are side views illustrating an antenna.
Figure 14B:
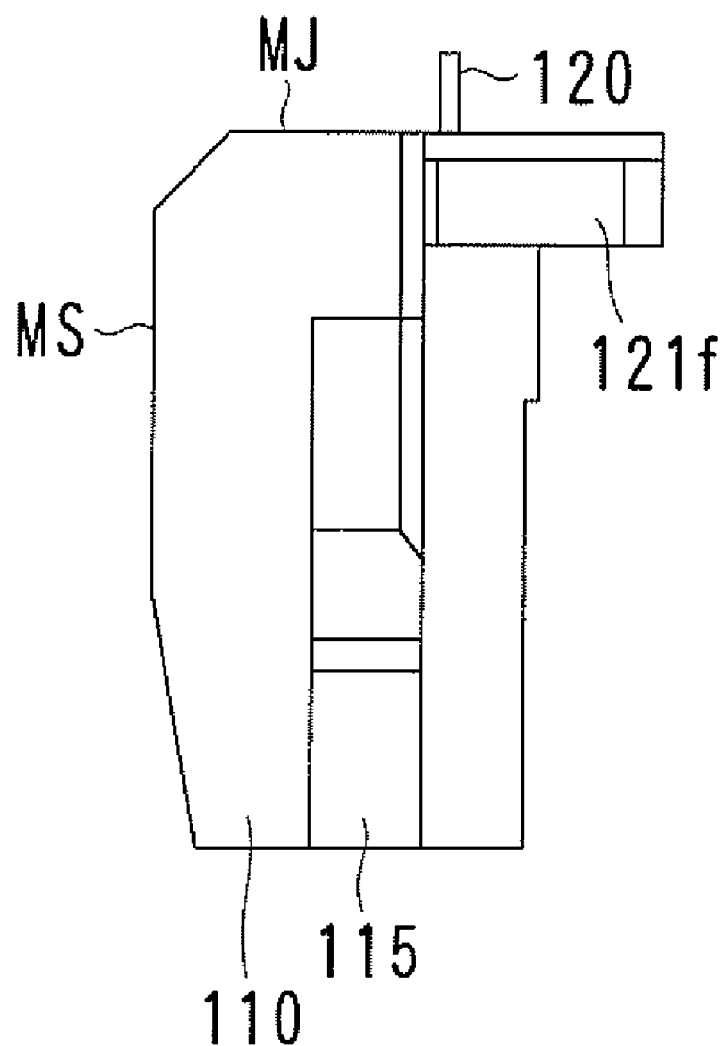
Figure 15A:
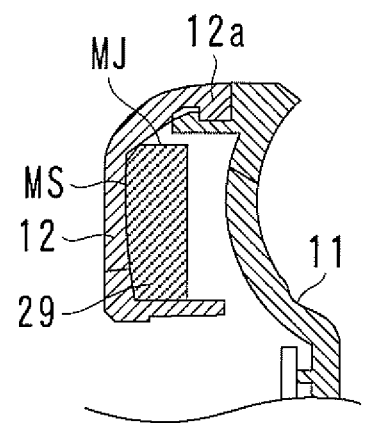
FIGS. 15A-15C are cross-sectional views respectively cut along the line A-A, the line B-B, and the line C-C on the mobile phone 1 illustrated in FIG. 6.
Figure 15B:
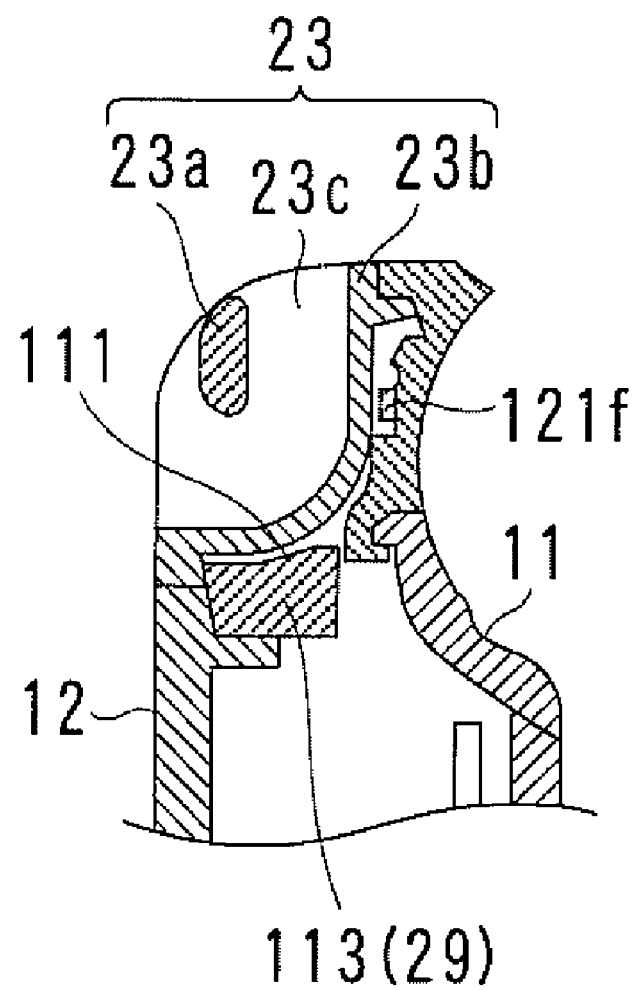
Figure 15C:
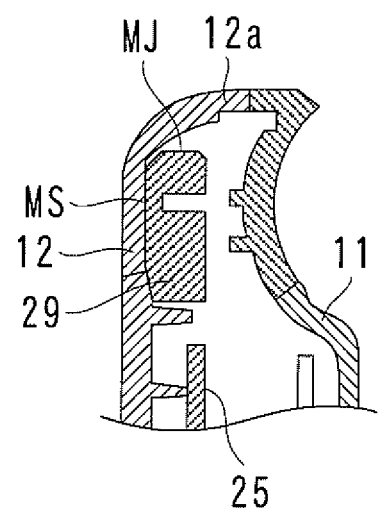

Note that, in order to facilitate understanding of the structure of the antenna 29, FIGS. 8 and 9 illustrate states in which the electronic components BH to be located on the antenna 29 are removed from the front case 11 and the rear case 12 respectively. FIGS. 8 and 9 illustrate the front of the antenna 29 and the back thereof respectively in such a manner that the structure of the antenna 29 is clarified. FIG. 15B is a cross-sectional view cut along the line B-B on the mobile phone 1 of FIG. 6, i.e., the line B-B passing through the strap retaining portion 23, and FIGS. 15A and 15C are cross-sectional views cut along the line A-A and the line C-C respectively on the mobile phone 1 of FIG. 6, i.e., the line A-A and the line C-C corresponding to both sides of the strap retaining portion 23.

Referring to FIGS. 8 and 9, the antenna 29 is located in the rear case 12 along the inside surface of the upper side 12a thereof. Stated differently, the antenna 29 is substantially fitted into the rear case 12. FIG. 8 illustrates the state in which the rear case 12 is detached from the front case 11 and the antenna 29 projects over the printed circuit board 25.

As discussed above, the rear case 12 is provided with the strap retaining portion 23 which projects into the rear case 12 at the center of the upper side 12a thereof. As clearly illustrated in FIGS. 6, 9, and 15B, the strap retaining portion 23 includes a strap shaft part 23a and strap wall parts 23b and 23c, all of which are integrally formed with the rear case 12. On the inside surface of the rear case 12, the strap wall part 23b extends downward to form a planar shape from the upper side 12a, and extends to the surface of the rear case 12 to form a partial cylindrical shape. The strap wall parts 23c are formed to close both the end faces of the strap wall part 23b. A strap is, for example, inserted into a space formed by the strap shaft part 23a, the strap wall part 23b, and the strap wall parts 23c, and is wound around the strap shaft part 23a, so that the strap is attached to the strap retaining portion 23.

The antenna 29 is composed of antenna elements 121 and 122 integrally formed with a bar-shaped support member 110 made of a synthetic resin. The support member 110 is provided with a concave portion 111 to avoid interfering with the strap wall part 23b. The antenna element 121 is located in such a manner that it straddles a gap between the edge portions of side walls 112a and 112b of the concave portion 111 to avoid interfering with the strap wall part 23b.

The support member 110 is divided, at the concave portion 111, into two parts in the length direction (the direction of arrow M1), except for a connection portion 113 that is a part of the support member 110 in the width direction. The antenna element 121 is formed in such a manner that a metal wire 121f constituting the antenna element 121 straddles over the concave portion 111.

The side walls 112a and 112b of the concave portion 111 are fitted into the strap wall part 23b; thereby positioning of the antenna 29 in the length direction is made.

The antenna 29 is located in the rear case 12 in such a manner that the main parts of the antenna elements 121 and 122, i.e., the front-side parts thereof, are positioned on a surface away from the printed circuit board 25 located in the front case 11.

A detailed description is given below.

Referring to FIGS. 10-15C, the antenna 29 has a bar-like shape with an approximate rectangular cross-section. The antenna 29 is formed by an insert molding process using a synthetic resin such as an ABS resin, the antenna elements 121 and 122, and a feeder electrode 120, each of which has been formed into a predetermined shape. Holes 116, which have served to support the antenna elements 121 and 122 during the insert molding process, remain in the support member 110. The entire shape of the support member 110 corresponds to the shape of the inside surface of the rear case 12. The support member 110 has, at an end portion opposite to the feeder electrode 120, a projection 115 that engages with a wall part of the rear case 12 or other electronic components BH when the antenna 29 is fitted into the rear case 12; thereby misalignment between the antenna 29 and the rear case 12 is prevented.

The antenna elements 121 and 122 are formed by a press molding process using a metal material such as beryllium copper. The feeder electrode 120 is obtained by plating, with gold, the surface of the resultant produced by a molding process using phosphor bronze. The feeder electrode 120 is provided with a mounting hole 120a through which the screw 19 for coupling the front case 11 and the rear case 12 together passes. Thereby, the antenna 29 is entirely sandwiched between the front case 11 and the rear case 12, so that the antenna 29 is fixed therebetween.

The antenna element 121 is composed of strip-like metal wires 121a-121v extended and bent in the stated order. The antenna element 121 is to transmit and receive radio waves, for example, in 2 GHz frequency band. The antenna element 122 is composed of strip-like metal wires 122a-122c, which have a width larger than that of the antenna element 121, extended and bent in the stated order. The antenna element 122 is to transmit and receive radio waves, for example, in 800 MHz frequency band.

The main parts of the antenna elements 121 and 122 are formed on the front face MS and the top face MJ of the support member 110. The antenna 29 is located inside the rear case 12 in such a manner that the front face MS and the top face MJ of the support member 110 are closest to the inside surface adjacent to the upper side 12a of the rear case 12 (see FIGS. 15A-15C).

As described above, the main parts of the antenna elements 121 and 122 are located away from the printed circuit board 25 and the electronic components BH mounted thereon. This reduces the influence of the printed circuit board 25 and the electronic components BH inflicted on the antenna 29, and also reduces the influence of radio waves emitted from the antenna 29 inflicted on the printed circuit board 25 or inflicted on the electronic components BH. Hence, the antenna is configured to exhibit good performance.

The antenna element 121 is formed, on the front face MS and the top face MJ of the support member 110, to have a meandering shape and extends along the length direction. Further, the antenna element 121 slightly projects, like a bridge, beyond the concave portion 111 on the side of the back face of the rear case 12 to avoid interfering with the concave portion 111. The antenna element 122 is formed, on the front face MS and the top face MJ of the support member 110, to have a meandering shape and extend along the circumferential direction while winding around the support member 110. In short, the antenna 29 is a dual band antenna. The antenna elements 121 and 122 are formed to have the shapes and length as described above, and conform to standards of, for example, receiver sensitivity, radiation efficiency, directivity, and impedance in a predetermined frequency band.

According to the structure of the antenna 29 in the embodiment described above, even if a projection is provided at the center of the rear case 12 due to the strap retaining portion 23, it is possible to place the antenna 29 so as to avoid interfering with the concave portion. Further, positioning of the antenna 29 in the length direction may be made by fitting the side walls 112a and 112b of the concave portion 111 into the strap wall part 23b, which facilitates mounting of the antenna 29 on the rear case 12.

In the embodiment discussed above, the antenna 29 may be a monopole antenna, a dipole antenna, an inverted-F antenna, an inverted-L antenna, and various other antennas. The overall structure of the antenna 29, the antenna elements 121 and 122, the printed circuit board 25, the casing KT, or the mobile phone 1, or the structures of various portions thereof, the constitution, the shape, the size, the molding method, the production method, the arrangement, the quantity, the material, the position, the frequency, and the like may be altered as required in accordance with the subject matter of the present invention.

In the embodiment discussed above, the description is provided of the folding mobile phone 1. The embodiment is also applicable to a non-folding mobile phone, and a variety of other folding or non-folding mobile terminals such as PDAs and lap top computers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An antenna built in a mobile terminal, the mobile terminal including a front case that has an operation portion on a surface of the front case and a rear case that is arranged on a rear side of the front case, the antenna comprising:
   a support member that has a bar shape, is made of a synthetic resin, and is located in the rear case along an upper side of an inside surface of the rear case;
   an antenna element integrally formed with the support member; and
   a concave portion provided in the support member to avoid interfering with a strap retaining portion that projects into the rear case at a center of the upper side of the rear case,
   wherein the antenna element is formed in such a manner that the antenna element straddles a gap between edge portions of both side walls of the concave portion to avoid interfering with the strap retaining portion.

2. The antenna built in the mobile terminal according to claim 1,
   wherein the support member is divided, at the concave portion, into two parts in a length direction of the support member, except for a part of the support member in a width direction of the support member, and
   the antenna element is formed in such a manner that a metal wire constituting the antenna element straddles over the concave portion.

3. The antenna built in the mobile terminal according to claim 2, wherein the antenna element is formed in the rear case in such a manner that a main part of the antenna element is positioned on a surface away from a printed circuit board located in the front case in a case where the antenna is built in the mobile terminal.

4. The antenna built in the mobile terminal according to claim 2,
   wherein the antenna element includes two types of antenna elements that cover different frequency bands,
   one of the two types of antenna elements is formed to extend along the length direction of the support member, and
   the other of the two types of antenna elements is formed to extend around a circumference of the support member.

5. A terminal comprising:
   a casing;
   a front case included in the casing, the front case having an operation portion on a surface thereof;
   a rear case included in the casing, the rear case being arranged on a rear side of the front case; and
   an antenna built in the casing,
   wherein the rear case is provided with a strap retaining portion that projects into the rear case at a center of an upper side of the rear case, the antenna is constituted by integrally forming an antenna element with a support member that has a bar shape, is made of a synthetic resin, and is located in the rear case along the upper side of an inside surface of the rear case, the support member is provided with a concave portion to avoid interfering with the strap retaining portion, and the antenna element is formed in such a manner that the antenna element straddles a gap between edge portions of both side walls of the concave portion to avoid interfering with the strap retaining portion.

6. The terminal according to claim 5, wherein the support member is divided, at the concave portion, into two parts in a length direction of the support member, except for a part of the support member in a width direction of the support member, and the antenna element is formed in such a manner that a metal wire constituting the antenna element straddles over the concave portion.

7. The terminal according to claim 6, wherein positioning in a length direction of the antenna is made by fitting the both side walls of the concave portion into the strap retaining portion.

8. The terminal according to claim 6, wherein the antenna is formed in the rear case in such a manner that a main part of the antenna element is positioned on a surface away from a printed circuit board located in the front case.

* * * * *